Aug. 19, 1958 O. CONRAD Re. 24,520

SELF-RETAINING LATCH

Original Filed Feb. 16, 1953 2 Sheets-Sheet 1

INVENTOR.
Owen Conrad.

BY

ATTORNEY

SELF-RETAINING LATCH

Original Filed Feb. 16, 1953 2 Sheets-Sheet 2

INVENTOR.
Owen Conrad.
BY
ATTORNEY

United States Patent Office

Re. 24,520

Reissued Aug. 19, 1958

24,520

SELF-RETAINING LATCH

Owen Conrad, Miami, Fla., assignor to American Screen Products Company, a corporation of Florida Original No. 2,776,002, dated January 1, 1957, Serial No. 336,926, February 16, 1953. Application for reissue August 21, 1957, Serial No. 680,613

13 Claims. (Cl. 160—369)

Matter enclosed in heavy brackets [ ] appears in the original patent but forms no part of this reissue specification; matter printed in italics indicates the additions made by reissue.

This invention relates to latches of general utility adaptable as a plain latch, a locking latch, a hook latch, cam latch, and others.

One of the objects of this invention is the provision of a latch having general application in various fields of use, and which is economical to manufacture, simple to attach, and easy to operate.

Another object of the invention is the provision of a latch having particular application for use in a tubular or hollow type of screen frame and storm sashes to attach and secure them to a window or door.

A further object is the provision of a latch which obviates the need of attaching screws, clips, rivets, springs, and the like.

A still further object is the provision of such a latch which, after installation, will not accidentally become loosened or disengaged.

These and other objects and advantages will appear more fully from the following description, considered together with the accompanying drawing, illustrating an embodiment of the invention in relation to the attachment of a framed screen to a window frame. The illustration of the invention in connection with a framed screen, however, is given merely by way of an example of one of the many different applications to which the invention is adaptable.

Figure 1:
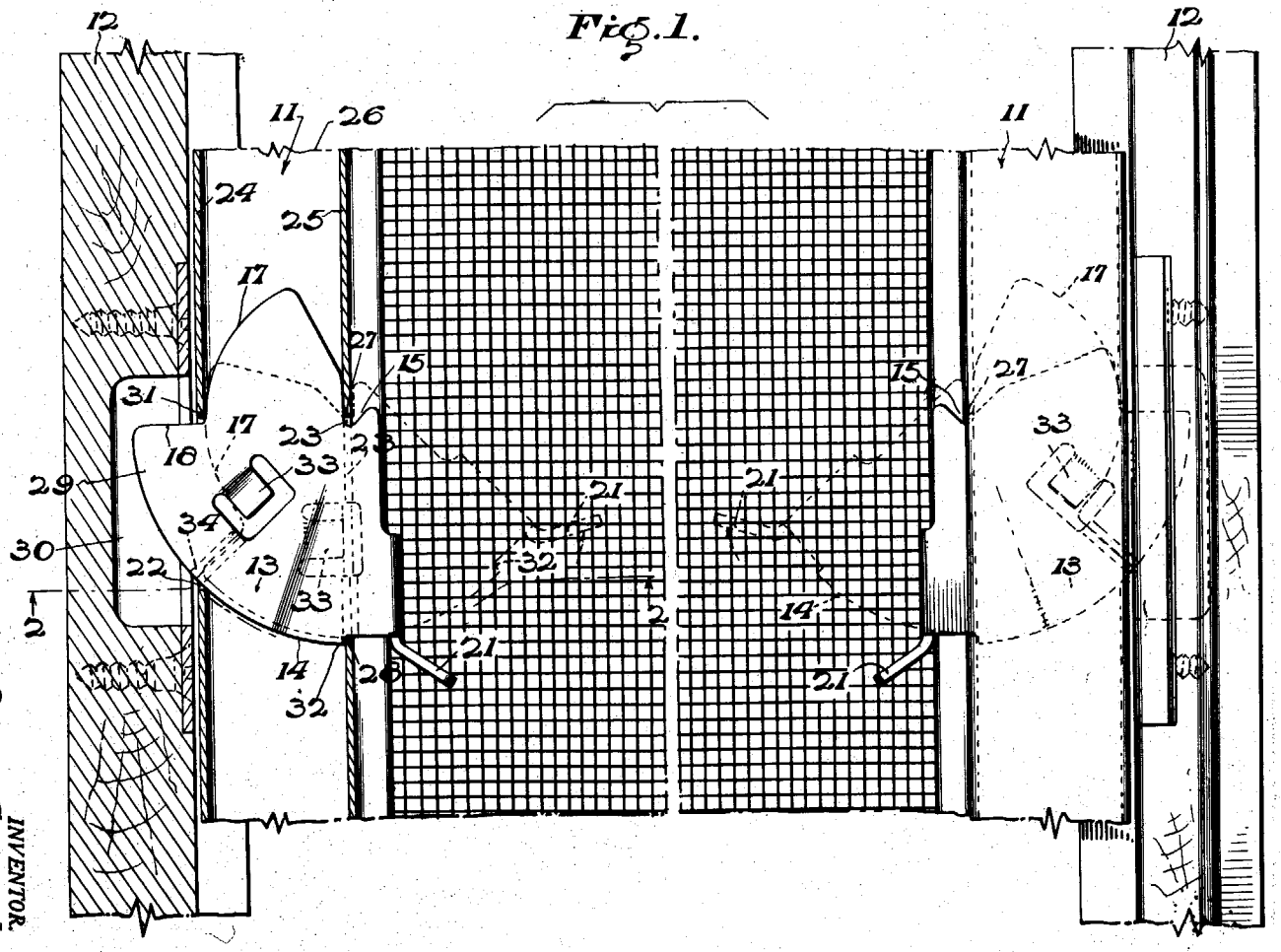
Figure 1 is a front elevational view, partly in section, of a portion of a tubular type screen frame and window frame, which incorporates latches in accordance with an embodiment of this invention for holding the screen frame on the window frame.
Figure 2:
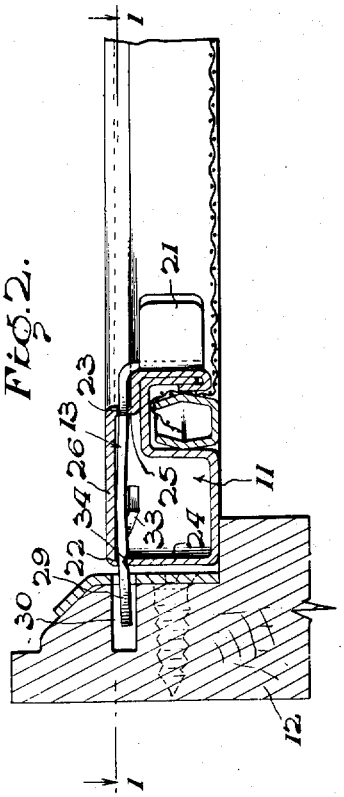
Figure 2 is a plan section along the line 2—2 of Figure 1.
Figure 3:
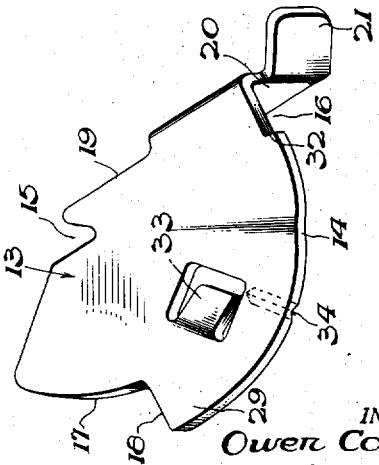
Figure 3 is a perspective view of the tongue member of the latch.

Referring with more particularity to Figures 1, 2 and 3, the embodiment is illustrated in relation to the fastening of a framed screen to a window frame. The frame 11 of the screen is of the hollow or tubular type which fits into a recess of the window frame 12, the latch being used to hold the screen frame in the recess. A sufficient number of such latches are spaced around the frame to hold the screen in place and each latch comprises a disc member 13 cut and bent in the irregular shape shown in Fig. 3. The shape includes a curved edge portion 14, a V-notch 15, a recess 16, another curved edge portion 17 recessed from the curved portion 14 forming a shoulder 18 therebetween.

*The notch 15 performs the dual function of interlocking the disk with the screen frame and providing a pivoting or fulcruming point about which the disk may move. That is to say, the base or apex of the notch formed at the intersection of its sides pivotally abuts the upper edge of slot 23 and the angle between the sides may be any degree less than 180° which will provide a pivoting point, and, at the same time, permit the disk to swing between an operative latching position and an inoperative interlocking position.*

The V-notch 15 is opposite the curved portion 14 and its apex is at the center of curvature of the curved portions 14 and 17, both of the curved portions being circular arcs. On the side of the V-notch, opposite the curved portion 17, a generally straight portion 19 extends from the notch toward the recess 16, interposed by a portion 20 bent at right angles to the plane of the disc. The portion 20 has an extension 21 bent outwardly at an angle and which serves as a finger tab for pivotally moving the disc.

The disc operates in a pair of lanced slots 22 and 23 of the screen frame. These slots are formed in the parallel transverse side walls 24 and 25 of the screen frame member, adjacent the back wall 26. The disc is inserted with the apex of the notch 15 engaging the upper edge 27 of the slot 23, the curved portion 14 being in slidable engagement with the bottom edge 28 of the slot. The disc is then pivoted inwardly about the notch which causes a part of the curved portion 14, including the shoulder 18, to be presented as a tongue 29 and to project through the other slot 22 and into a recess or well 30 of the window frame 12. When the tongue 29 is in its fully protracted position, the shoulder 18 abuts the upper edge 31 of the slot 22 and in this position also, the recess 16 is directly over the bottom edge 28 of the slot 23. This permits the disc to drop down, the shoulder 32 of the recess 16 acting as a catch against the bottom edge 28 to hold the tongue 29 of the disc in its protracted position, as shown by the full lines of Fig. 1. Retraction of the disc is effected by placing a finger or thumb against the bottom of the extension 21 and lifting upwardly and outwardly to disengage the shoulder 32 from the bottom edge 28 of the slot 23 and sliding the curved portion 14 in contact therewith until the retraction is complete. In the fully retracted position, shown by the broken lines in Fig. 1, an abutment member 33 comes to rest against the inside edge of the slot 23. The member 33 is provided by bending outwardly from the face of the disc a section which has been cut out on all sides but one, substantially as shown. For this purpose, the disc should be of a suitable material to provide the necessary resiliency for the member 33, such as aluminum, sheet iron, steel, etc.

In the fully retracted position also, a radial groove 34 on one side of the disc engages its adjacent side edge of the slot 23. The disc is slightly dished or bowed to resiliently urge the groove in a snapping engagement with the slot edge, as best illustrated in Fig. 2.

In moving the disc between the protracted and retracted positions, the curved portion 17 slidably engages the inner face of the wall 24 above the slot 22 to stabilize the position of the disc between the walls 24 and 25.

Figure 4:
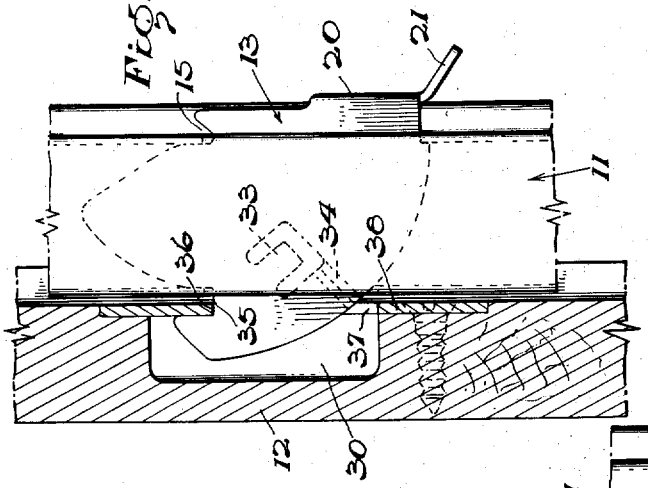
Figures 4 and 5 are views similar to Fig. 1 showing modifications of the embodiment.

The modification illustrated in Fig. 4 comprises forming a slot type hook 35 between the curved portions 14 and 17 to engage the upper edge 36 of a slot 37 in a face plate 38 over the recess or well 30 of the window frame. With latches of this type provided on opposite sides of the screen frame, it is held tightly in position laterally and prevents rattling.

Figure 5:
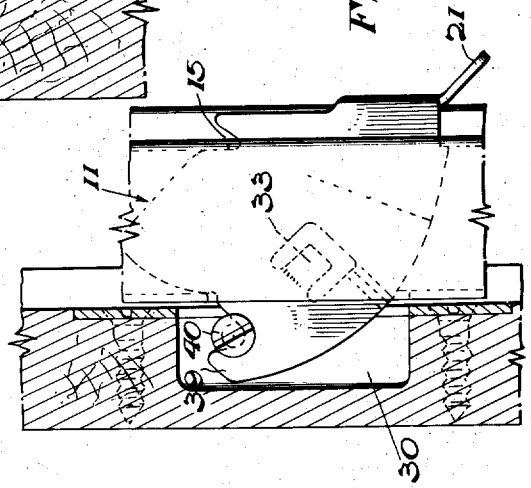

In Fig. 5 the modification is similar to that of Fig. 4, except that the bight of the hook 39 is curved and engages a transverse bolt 40 in the recess or well 30 of the window frame.

I claim:

1. In a hollow frame member having spaced parallel side walls and having a first slot in one of said walls and a second slot in the other wall, a latch member adapted to be mounted in the frame member, said latch member comprising a disc loosely mounted in the hollow frame for bodily shifting movement and pivotal movement, said disc being formed with a V-notch at the top, said notch pivotally engaging the upper edge of the first slot, said disc having a circular portion normally slidably engaging the lower edge of the first slot, and a portion presented as a tongue slidably engaging the second slot, said tongue portion being protruded beyond the second slot when the disc is pivotally moved in one direction about the V-notch and being retracted when the disc is pivotally moved in the opposite direction, said disc having a recessed portion at one end of the circular portion to engage the lower edge of the first slot when the disc is pivoted to the position where the tongue portion protrudes through the second slot, said disc being provided with a second circular portion in slidable engagement with the wall containing the second slot.

2. In a hollow frame member having spaced parallel side walls and having a first slot in one of said walls and a second slot in the other wall, a latch member adapted to be mounted in the frame member, said latch member comprising a disc loosely mounted in the hollow frame for bodily shifting movement and pivotal movement, said disc being formed with a V-notch at the top, said notch pivotally engaging the upper edge of the first slot, said disc having a circular portion normally slidably engaging the lower edge of the first slot, and a portion presented as a tongue slidably engaging the second slot, said tongue portion being protruded beyond the second slot when the disc is pivotally moved in one direction about the V-notch and being retracted when the disc is pivotally moved in the opposite direction, said disc having a recessed portion at one end of the circular portion to engage the lower edge of the first slot when the disc is pivoted to the position where the tongue portion protrudes through the second slot, a portion of the disc being yieldably set outwardly from the plane of the disc to abut the inner side of the wall containing the first slot when the disc is pivoted to retract the tongue member.

3. In a hollow frame member having spaced parallel side walls and having a first slot in one of said walls and a second slot in the other wall, a latch member adapted to be mounted in the frame member, said latch member comprising a disc loosely mounted in the hollow frame for bodily shifting movement and pivotal movement, said disc being formed with a V-notch at the top, said notch pivotally engaging the upper edge of the first slot, said disc having a circular portion normally slidably engaging the lower edge of the first slot, and a portion presented as a tongue slidably engaging the second slot, said tongue portion being protruded beyond the second slot when the disc is pivotally moved in one direction about the V-notch and being retracted when the disc is pivotally moved in the opposite direction, said disc having a recessed portion at one end of the circular portion to engage the lower edge of the first slot when the disc is pivoted to the position where the tongue portion protrudes through the second slot, said disc being provided with a groove on one face thereof to engage the adjacent edge of the first slot when the tongue is in retracted position, said disc being also cupped to resiliently urge the disc against said edge.

4. In a hollow frame member having spaced parallel side walls and having a first slot in one of said walls and a second slot in the other wall, a latch member adapted to be mounted in the frame member, said latch member comprising a disc loosely mounted in the hollow frame for bodily shifting movement and pivotal movement, said disc being formed with a V-notch at the top, said notch pivotally engaging the upper edge of the first slot, said disc having a circular portion normally slidably engaging the lower edge of the first slot, and a portion presented as a tongue slidably engaging the second slot, said tongue portion being protruded beyond the second slot when the disc is pivotally moved in one direction about the V-notch and being retracted when the disc is pivotally moved in the opposite direction, said disc having a recessed portion at one end of the circular portion to engage the lower edge of the first slot when the disc is pivoted to the position where the tongue portion protrudes through the second slot, said tongue portion being provided with an upwardly facing abutment shoulder.

5. In a hollow frame member having spaced parallel side walls and having a first slot in one of said walls and a second slot in the other wall, a latch member adapted to be mounted in the frame member, said latch member comprising a disc loosely mounted in the hollow frame for bodily shifting movement and pivotal movement, said disc being formed with a V-notch at the top, said notch pivotally engaging the upper edge of the first slot, said disc having a circular portion normally slidably engaging the lower edge of the first slot, and a portion presented as a tongue slidably engaging the second slot, said tongue portion being protruded beyond the second slot when the disc is pivotally moved in one direction about the V-notch and being retracted when the disc is pivotally moved in the opposite direction, said disc having a recessed portion at one end of the circular portion to engage the lower edge of the first slot when the disc is pivoted to the position where the tongue portion protrudes through the second slot, said tongue portion being provided with a hook.

6. In a hollow frame member having spaced parallel side walls and having a first slot in one of said walls and a second slot in the other wall, a latch member adapted to be mounted in the frame member, said latch member comprising a disc loosely mounted in the hollow frame for bodily shifting movement and pivotal movement, said disc being formed with a V-notch, said notch pivotally engaging an edge of the first slot, said disc having a circular edge normally slidably engaging the opposite edge of the first slot, and a portion presented as a tongue slidably engaging the second slot, said tongue portion being protruded beyond the second slot when the disc is pivotally moved in one direction about the V-notch and being retracted when the disc is pivotally moved in the opposite direction.

7. A latch device for a hollow frame member having spaced parallel side walls and slots in said walls, said latch device comprising a disc adapted to be disposed in said slots, said disc being formed with a V-notch to pivotally engage an edge of one of said slots, said disc having a circular edge to normally lie adjacent the slot edge opposite said notch engaging edge, said disc having a portion presented as a tongue adapted to slidably engage the other slot.

8. A latch device comprising a disc member in the general shape of a sector of a circle having a circular edge and a V-notch opposite the circular edge, a portion of said disc member intermediate the circular edge and V-notch being bent outwardly from the plane of the disc.

9. A latch device comprising a disc member in the general shape of a sector of a circle and having a circular edge and a V-notch opposite the circular edge, a portion of said disc member intermediate the circular edge and V-notch being bent outwardly from the plane of the disc, said bent portion having an extension thereof set an an angle thereto to form a finger tab.

*10. In a hollow frame member having spaced parallel side walls and provided with a first slot in one of said walls and a second slot in the other of said walls, a latch member adapted to be mounted and secured in sustaining position in the frame member by the mere act of inserting the latch into the slots, said latch member comprising a disc loosely mounted in the said slots of the hollow frame for bodily shifting pivotal movement, said disc provided with a notch opening at one edge thereof and whose edges*

*substantially embrace opposite sides of the first slot as the bottom of the notch pivotally engages the upper edge thereof, said disc having a circular edge opposite the bottom of said notch and which curved edge of the disc normally engages the lower edge of the first slot, and a tongue portion protruding into the second slot when the disc is pivotally moved in one direction in relation to said notch, and means engaging an edge of the member having the first slot for restricting the disc when it is pivotally moved in the opposite direction.*

*11. A latch device for self-sustaining mounting within spaced members having slots by the mere act of engaging a portion of the device with an edge of one of said slots and inserting the device in both of said slots, said device comprising, a disc member in the general shape of the sector of a circle and having a notch in the apical portion thereof, said notch having a mouth opening through one edge thereof and an inwardly disposed pivoting base, a circular edge opposite the base of the notch, a locking tongue at one side of said circular edge, a finger tab at the other side of said circular edge and means on the body portion of the disc engaging an edge of the slot in one of said members for restricting its pivotal movement about the base of said notch in the direction of the tab.*

*12. A latch device for self-sustaining pivotal mounting within spaced members having opposite registering slots by the mere act of engaging a portion of the device with the edge of one of said slots and inserting said device in both of said slots, said device comprising, in combination, a disc member provided with a circular edge, means on said member opposite said edge forming a pivoting notch*

*including converging side edges terminating in a pivot bearing about which the disc member may turn, said notch having a mouth opening at the edge of said member opposite said circular edge to receive an end of one of said slots by movement of the disc member in the plane thereof toward said end, and a finger tab between one side of said notch and a terminal portion of the said edge.*

*13. A latch device for self-sustaining pivotal mounting within spaced members having registering slots by the mere act of engaging a portion of the device with an edge of one of said slots and inserting the device in both of said slots, said device comprising, in combination, a disc member provided with a notch having a mouth opening outwardly at one edge and including converging side edges terminating in a pivoting base for said member, a circular edge on said member formed on a radius whose axis lies in said pivoting base, means at one side of said circular edge for manipulating the latch, and means on the body of the latch member for engaging an edge of a slot in one of said members for restraining its pivotal movement in the slots of the frame.*

References Cited in the file of this patent or the original patent

UNITED STATES PATENTS

| | | |
|---|---|---|
| 99,325 | Kline | Feb. 1, 1870 |
| 417,868 | Janes | Dec. 24, 1889 |
| 753,544 | Cassidy | Mar. 1, 1904 |
| 1,954,640 | Loper | Apr. 10, 1934 |
| 2,184,674 | Jorgensen | Dec. 26, 1939 |